Patented June 25, 1946

2,402,530

UNITED STATES PATENT OFFICE 2,402,530

CHEMICAL PROCESS

Euclid W. Bousquet, Wilmington, Del., assignor to E. I. du Pont de Nemours & Company, Wilmington, Del., a corporation of Delaware No Drawing. Application January 22, 1941, Serial No. 375,461

3 Claims. (Cl. 260—404)

This invention relates to the manufacture of N-isobutylamides of castor oil acids and is directed particularly to methods in which castor oil is heated with an amount of isobutylamine which is at least equivalent to the combined ricinoleic acid in the castor oil at a temperature above 100° C. and at a superatmospheric pressure determined by the combined vapor pressures of the reactants at the operating temperature.

The N-isobutylamide of ricinoleic acid, which is the predominant acid component of castor oil, is known to be of value in the control of insect pests. The N-isobutylamide of undecylenic acid is likewise known to be useful in insect control and is so much more effective than the N-isobutylamide of ricinoleic acid that it has heretofore been customary to obtain undecylenic acid by the pyrolysis of castor oil and to form the N-isobutylamide by reacting the acid with isobutylamine. It has now been found that this is unnecessary and that the N-isobutylamide of undecylenic acid may be obtained directly by subjecting the N-isobutylamide of ricinoleic acid to pyrolysis. It is an object of this invention to provide a method for preparing the N-isobutylamide of ricinoleic acid particularly adapted to produce a product which can be readily pyrolyzed to N-isobutylundecylenamide.

Of the numerous general amidation processes known in the art and in the numerous variable conditions for operating such processes I have discovered a set of conditions which are peculiarly adapted to the production of the N-isobutylamide of ricinoleic acid in a form suitable for pyrolysis to the N-isobutylamide of undecylenic acid. I obtain these ends by heating raw castor oil in admixture with N-isobutylamine in a molar ratio of substantially 1 to 3 to a temperature above about 100° C. and under an initial pressure of at least 25 lbs. per sq. inch.

The composition of castor oil is known to vary somewhat, depending, among other factors, on source, method of isolation and type of purification process to which the raw oil has been subjected. Any one of the usual commercial grades of castor oil is suitable for the practice of this invention. The term "raw castor oil" as used herein therefore refers to any of the commercially available grades of raw castor oil.

According to one form of my invention the N-isobutylamide of ricinoleic acid, in admixture with minor amounts of the N-isobutylamides of the other acids normally present in castor oil is obtained by freeing the product of reaction of isobutylamine and raw castor oil from any unreacted isobutylamine and any by-product of the reaction. This form of my invention is illustrated in the following example in which the parts are by weight unless otherwise specified.

Example 1

Thirty-one parts of castor oil and 9 parts of isobutylamine are charged into a pressure vessel of such dimensions that on heating to 165° C. a pressure of 100 to 150 lbs. per sq. inch is generated. After heating at 165° C. for 16 hours a product is obtained which is almost white, is of Vaseline-like consistency, and melts at about 30° C. The crude product is washed with several portions of hot water, dissolved in ether, and washed with dilute hydrochloric acid until free from amine. The ether solution is then dried over anhydrous sodium sulfate and evaporated in vacuo. Thirty parts of a product analyzing 3.7% nitrogen is obtained.

In this form of my invention the reaction is most suitably carried out at a temperature between about 100° C. and 250° C. and at a pressure between about 25 and 2000 lbs. per sq. inch. Within these limits those skilled in the art will be able to select suitable combinations of temperature and pressure and will be able to vary the relative conditions as desired by the inclusion of low boiling or high boiling solvents or by introducing a gas under pressure. The time required for the reaction is that necessary to obtain the desired degree of amidation and must be determined for any particular set of conditions.

The crude product may be purified in any suitable manner. Instead of washing and treating the product as described in the above example I may simply subject it to vacuum distillation, e. g., at 2 mm. pressure. The fraction boiling below about 160° C. will account for substantially all the excess or unreacted isobutylamine and the glycerol, leaving as a still residue a mixture of N-isobutylamides of castor oil acids suitable for pyrolysis to N-isobutylundecylenamide.

The N-isobutylamides of castor oil acids obtained as described above may be converted into the N-isobutylamide of undecylenic acid in yields of 75% or more. The conversion is effected by vaporizing the castor amide, passing the vapor downwardly through a vertically mounted stainless steel tube, having an internal diameter of 1.6 inches and a length of 30 inches, at a rate of 3000 cc. of liquid per hour, at 500° C. and at atmospheric pressure, and passing the cracked material through a water-cooled condenser into a receiver. From this condensate the N-isobutyl-undecylenamide is obtained as the fraction boiling at 152° to 159° C. at 1 mm. pressure.

Other methods of cracking the N-isobutyl-amides of the castor oil acids may be employed. Thus, the amides may be taken up in a low boiling solvent, such as toluene, and the solution fed to a vaporizing and cracking zone of the character described above, or the amide or a solution thereof may be subjected to cracking under sufficient pressure to prevent vaporization.

According to another form of the process I do not isolate the N-isobutylamides of castor oil acids, but subject the crude product, for example, as obtained in Example 1, to pyrolysis. In still another modification I effect the amidation at a temperature such that the amidation and cracking reactions take place simultaneously. This modification is illustrated in the following example in which the parts are by weight unless otherwise specified.

*Example 2*

A toluene solution of 311 parts of castor oil, 73 parts of isobutylamine, and 418 parts of toluene is pumped at the rate of 1320 parts per hour through a cracking unit maintained at 475° C. under a pressure of 1000 lbs. per sq. inch, the pressure being initially established in the apparatus by means of nitrogen. The apparatus consists of a helically wound tube embedded in a cylindrical aluminum casting. The helix is prepared from a 6-foot length of ¼ inch O. D. and ⅛ inch I. D. chrome-nickel (18–8) stainless steel tubing and embedded in an aluminum casting having a diameter of about 2.9 inches and a length of about 18 inches, with 6-inch portions of the tube projecting from each end of the casting. The whole is placed in an electric furnace and provided with suitable controlling instruments, including a thermocouple located in the center of a horizontal section six inches from the top of the casting. In operation the unit is mounted vertically and includes a pump to feed the liquid to be cracked into the lower end of the cracking tube and a receiver connected through a water-cooled condenser with the top of the cracking tube. The receiver is provided with a pressure gauge and a valve so that the unit can be operated at the desired pressure. Any tendency toward a rise in pressure during operation is counteracted by releasing nitrogen, or, when this is exhausted, the liquid or gaseous product from the receiver as required. The N-isobutylundecylenamide is isolated from the product in the manner described in Example 1.

Variations in the temperatures and pressures employed and in the nature of the apparatus may be made within the scope of my invention. Preferably, however, a temperature in the cracking zone of between about 400° and 550° C. and pressures ranging from atmospheric to 2000 lbs. per sq. inch are maintained. Instead of maintaining a single zone of high temperature I may maintain a plurality of zones at different temperatures. Thus, I may maintain an amidation zone at a temperature between about 100° and 250° C. and a cracking zone between 400° and 550° C. In the amidation zone the diameter of the tube may be made larger in view of the slower rate of reaction, or I may combine the pressure vessel of Example 1 and the helical cracking tube of Example 2, maintaining in the pressure vessel a large body of product which is highly amidated by gradually introducing small increments of castor oil and isobutylamine and bleeding off corresponding increments of the product into the cracking zone. In these and various other ways I am able to interrelate and correlate my amidation processes with the cracking processes.

As many apparently widely different embodiments of my invention may be made without departing from the spirit and scope thereof, it is to be understood that the invention is not limited except as defined by the following claims.

I claim:

1. The method of preparing N-isobutylamides of castor oil acids which comprises heating castor oil in admixture with isobutylamine at a temperature between 100° C. and 250° C. and at a pressure between 25 and 2000 lbs. per square inch absolute, and recovering the N-isobutylamides of the castor oil acids free of glycerol and isobutylamine.

2. The method of preparing N-isobutylamides of castor oil acids which comprises heating castor oil in admixture with isobutylamine in approximately the ratio of one mole of castor oil to three moles of amine in a closed reaction vessel such that on heating to a temperature between 100° C. and 250° C. a pressure from 100 to 150 lbs. per square inch is generated, continuing the heating until substantial amidation takes place and recovering the N-isobutylamides of the castor oil acids free of glycerol and isobutylamine.

3. The method of preparing N-isobutylamides of castor oil acids which comprises heating castor oil in admixture with isobutylamine in the proportions of substantially one mole of castor oil to three moles of isobutylamine at a temperature of approximately 165° C. and at a pressure of 100 to 150 lbs. per square inch until a product which is almost white, quite viscous and melts at about 30° C. is obtained and recovering the N-isobutylamides of castor oil acids from this product free of glycerol and isobutylamine.

EUCLID W. BOUSQUET.